3,227,790
PROCESS FOR GRANULATION OF PERBORATE
Gunther Bretschneider, Gelnhausen, Peter Kuzel, Gross-Auheim, Horst Pistor, Rheinfelden/Baden, and Fritz Sperr, Frankfurt am Main, Germany, assignors to Deutsche Gold- und Silber-Scheideanstalt vormals Roessler, Frankfurt am Main, Germany
No Drawing. Filed Mar. 30, 1964, Ser. No. 355,947
Claims priority, application Germany, Apr. 1, 1963, D 41,260
9 Claims. (Cl. 264—117)

The present invention relates to an improved process for the production of granular sodium perborate which is particularly adapted as a component of modern washing compositions.

Sodium perborate is an important component of modern washing (detergent) compositions. It is important that the grain size thereof is compatible with the grain size of the remaining components of the washing composition in order to prevent segregation of the components. In general, sodium perborates with average grain sizes between about 0.5 and 1.5 mm. with a bulk density between about 0.3 and 0.6 kg./liter, preferably about 0.4 kg./liter, best meet the requirements. In addition to providing a distribution which corresponds to the Gaussian distribution curve of the washing agent powder employed, good solubility characteristics are also desired.

Although a number of procedures have been described for the production of coarse grained perborates of low bulk density no commercial products with the desirable grain sizes and bulk densities indicated above have become known.

It is, for example, known that crumbs of sodium perborate or mixtures containing sodium perborate can be produced by first subjecting the still moist starting material to the rather vigorous mechanical action of rapidly rotating paddles or stirring arms or the like and then subsequently heat treating the product in a rotating drum to effect drying thereof. According to such process granulates can be obtained with average grain sizes between 0.5 to 1.5 mm. However, the bulk density thereof is not within the above indicated desired range.

It is also known that sodium perborate tetrahydrate can be mixed with an aqueous silicate solution and then to add powdered salts which take up water until a dry product is obtained. A granulated product of the desired grain size range is said to be obtained with such process but the speed of solution of such products is not satisfactory.

In addition, procedures have become known which make use of the property of sodium perborate tetrahydrate to soften and partially melt at temperatures above 40 to 50° C. for the production of granulated products. The disadvantage of this procedure resides in the losses of active oxygen which occur during the thermal treatment, as well as in the unsatisfactory solubility of the product. Furthermore, the technical control of such fusion process is not simple.

According to the invention it was unexpectedly found that sodium perborate could be converted to a granulated product in a simple manner by spraying superdried sodium perborate tetrahydrate in which the average water of crystallization content has been reduced by 0.2 to 3, preferably, 0.2 to 2 mol per mol of $NaBO_3$ with a quantity of water which is about sufficient to effect the reformation of the tetrahydrate and contains a binding agent dissolved therein while keeping the starting material in motion.

The products which are obtainable by such process have average grain sizes of 0.5 to 2 mm. and have bulk densities between about 0.3 and 0.6 kg./liter. The products therefore fulfill the desired requirements as to grain size and bulk density in an excellent manner and in addition at the same time possess the same rate of solution as the ungranulated finely crystalline sodium perborate tetrahydrate which served as starting material. The active oxygen content depending on desire can amount to 11% or somewhat lower.

The term "superdried sodium perborate tetrahydrate" is used herein to signify a sodium perborate tetrahydrate which has been converted into a water poor state by a heat treatment. For example, a sodium perborate tetrahydrate of the composition of the formula $$(NaBO_3) \cdot 4H_2O$$

can be converted by heat treatment into a composition in which the molar ratio of $NaBO_3$ to water of crystallization is 1:1–3.8. It is of importance that the water containing the binding agent is supplied thereto in such a way that the fully hydrated sodium perborate tetrahydrate is reformed. Large quantities of excess water are to be avoided as much as possible. In general, 1 to 2 mols of water per mol of perborate suffice. The quantity of water expediently is such that a stoichiometrically composed tetrahydrate is produced as a subsequent drying is then not necessary. Screening of the products is possible but in general is not necessary. If necessary, the coarse portions having a grain size above 2 mm. can be screened off and reduced to the desired grain size by careful grinding.

It also is possible to separate the smaller grain sizes of below about 0.3 mm. diameter by screening. The resulting fines which still, as a rule, have a water content below that of the perborate tetrahydrate can be mixed with fresh starting material to be granulated.

All organic, water soluble compounds which yield by concentrating their water solution into sticky and viscous masses and which also yield into plastic films can be employed as binding agents according to the invention. Examples are carboxy methyl celluloses, such as "Tylose," polyvinyl pyrolidone, such as "Kollidon," carboxyl group containing polyacrylic or polymethacrylic compounds, such as "Rohagit" which is a water soluble alkali metal salt of a polyacrylic or polymethacrylic resin, sugar, dextrin, polyvinyl alcohol and the like. They can be used singly or in admixture. Polyvinyl alcohol, dextrin and especially carboxyl group containing polyacrylic or polymethacrylic compounds are preferably employed as the binding agents. Polyvinyl alcohols and said polyacrylic or polymethacrylic compounds are effective binding agents in quantities considerably less than those required for most of the other substances indicated.

It is expedient to use the binding agent in as concentrated a form as possible. The upper limit of the concentration is determined by the viscosity of the solution and the solution should be such that it can be sprayed without difficulty.

The finer the superdried perborate used as the starting material, the lower is the bulk density of the product produced. However, on the other hand, the granulation action also decreased with increase in fineness of the particle size of the starting material.

In order that a product of as low a bulk density as possible is obtained, the movement of the starting material maintained while the latter is sprayed with the aqueous solution of the binding agent is as mild and moderate as possible. Vigorous stirring, pressing, rolling and similar measures which permit special mechanical forces to act upon the mass to be granulated should be avoided. Too high a bed of the material to be granulated or of the granulated product in a rotating tube similarly should be avoided. The height of such bed should be of the order of 3 to 8 cm. preferably, 3 to 5 cm. In the prrocess according to the invention the exterior forces applied to perborate crystals should be kept at a minimum. For instance, the turning movement of the rotating tube only has the purpose of constantly subjecting new materials to the action of the spray cone and is not for the purpose of compaction of the granulated product.

The process according to the invention can be carried out in a simple manner in that the superdried starting material is introduced into an inclined rotating tube and sprayed therein with the aqueous binding agent solution. It is not necessary to maintain special temperatures. A slight warming of the material occurs when the aqueous solution of the binding agent is sprayed on. In order that the granulated material be dry when it leaves the rotating tube, provision must be made that it stay in the tube for a sufficient period of time to permit the rehydration before discharge. An after treatment of the granulated material with warm air is only necessary when too large a quantity of the solution is employed for moistening the superdried perborate starting material. Preferably a granulation disk or granulation plate is used instead of a rotating tube for the process according to the invention. In this case the maintenance of a certain height of the bed of the perborate material is not necessary.

It is also possible to color the granules produced by incorporating a dye in the binding agent solution or by simultaneously applying a dye solution with the binding agent solution. It furthermore can be of advantage to add known stabilizers for active oxygen, such as magnesium compounds, for instance, magnesium silicate.

The following examples will serve to illustrate the present invention with reference to several embodiments thereof.

EXAMPLE 1

15.2 kg. of relatively fine grained sodium perborate (bulk density 650–700 g./l.) with an average water of crystallization content of 2.5 mol. per mol of $NaBO_3$ corresponding to an active oxygen content of 12.5% were supplied over a three hour period to the upper end of a slowly rotating rotary tube 700 mm. long, 300 mm. in diameter and a 1.5% incline. The material in the first third of the length of such rotary tube was sprayed with a total quantity of 3.5 liters of a 30% by weight aqueous dextrin solution ($d=1.12$) in such a way that 0.2–0.3 liter of such solution contacted each kg. of starting perborate. The lower outlet end of the rotary tube was provided with a retaining ring so that the height of the bed of material treated in such tube is maintained at 3 to 5 cm. The perborate which remained in the rotary tube for 15–30 minutes was discharged from the outlet end as a dry granular material and screened. 17.8 kg. of the granular product were produced. The distribution of the grain sizes, bulk densities and active oxygen content are given in the following Table 1. (The speed of rotation of the drum was 6 turns per minute.)

*Table 1*

| Sieve fraction | Percent | G./l. | Percent Oa |
| --- | --- | --- | --- |
| >1.5 mm | 20 | | |
| 0.75–1.5 mm | 26 | 335 | 10.2 |
| 0.4–0.75 mm | 36 | 375 | 10.7 |
| <0.4 mm | 18 | 480 | 11.0 |

EXAMPLE 2

13.6 kg. of sodium perborate of the same hydration step as in Example 1 were sprayed with a total of 3.1 liters of a 3% by weight aqueous polyvinyl alcohol (Mowiol) solution over a period of 3 hours in the same apparatus as in Example 1.

15.9 kg. of granulated perborate of the properties given in the following Table 2 were obtained:

*Table 2*

| Sieve fraction | Percent | G./l. | Percent Oa |
| --- | --- | --- | --- |
| >1.5 mm | 13 | | |
| 0.75–1.5 mm | 24 | 420 | 10.3 |
| 0.4–0.75 mm | 40 | 515 | 10.3 |
| <0.4 mm | 23 | 665 | 10.4 |

EXAMPLE 3

To the upper end of a slowly rotating rotary tube (10 turns per minute) 2200 mm. long, 450 mm. in diameter and a 2.5% incline were supplied 40 kg. per hour of fine grained sodium perborate with an active oxygen content of 13.0%. The height of the bed of material treated in such tube is maintained at about 4 cm. The material was sprayed with 10 liters per hour of 0.25% by weight of an aqueous Rohagit solution (0.25 liters per kg. of perborate). The properties of the product are given in Table 3:

*Table 3*

| Sieve fraction | Percent | G./l. | Percent Oa |
| --- | --- | --- | --- |
| >2.0 mm | <5 | | |
| 0.3–2.0 mm | 75–80 | 500 | 10.5 |
| <0.3 mm | 15–20 | 650 | 10.8 |

EXAMPLE 4

Sodium perborate as described in Example 1 was supplied on a granulation disk which had an inclination of 45°, a diameter of 400 mm. and 45 turns per minute. The material was granulated while a 15% by weight aqueous dextrin solution was sprayed on it. 50 kg. of the sodium perborate and 12.5 liters of such aqueous solution were used per hour. The resulting granulated product continuously runs over the border of the granulation disk and is transported within 20 minutes by a cooled belt to a silo. The properties of the product are given in Table 4.

*Table 4*

| Sieve fraction | Percent | G./l. | Percent Oa |
| --- | --- | --- | --- |
| >2.0 mm | <1 | | |
| 1.0–2.0 mm | 10 | 400 | 10.1 |
| 0.5–1.0 mm | 56 | 515 | 10.1 |
| 0.3–0.5 mm | 21 | 570 | 10.2 |
| <0.3 mm | 12 | 630 | 10.2 |

EXAMPLE 5

As described in Example 4, 40 kg. of sodium perborate (active oxygen content 12.5%) were granulated on a granulation plate and were sprayed with 10 liters of a 0.25% by weight aqueous Rohagit solution. The properties of the product are given in Table 5:

*Table 5*

| Sieve fraction | Percent | G./l. | Percent Oa |
| --- | --- | --- | --- |
| >2.0 mm | <5 | | |
| 1.0–2.0 mm | 15 | 430 | 10.0 |
| 0.5–1.0 mm | 40 | 540 | 10.1 |
| 0.3–0.5 mm | 23 | 585 | 10.2 |
| <0.3 mm | 17 | 645 | 10.3 |

We claim:
1. A process for granulating sodium perborate which comprises spraying a superdried finely divided sodium perborate tetrahydrate the content of water of crystallization of which has been reduced by 0.2 to 3 mol. per mol. of $NaBO_3$ with a quantity of water having a binding agent dissolved therein substantially equivalent to that required for complete rehydration of the super-dried sodium perborate to the tetrahydrate stage while maintaining relative movement between the finely divided perborate and the granules produced therefrom during such spraying and the ensuing rehydration.

2. The process of claim 1 in which the starting material while it is sprayed with the aqueous solution of the binding agent and while it soaks such solution is moved mildly and moderately.

3. The process of claim 1 in which the perborate material is supported by the walls of a rotary tube and maintained in motion by rotation of such tube about its longitudinal axis while it is sprayed with the aqueous binding agent solution and rehydrated.

4. The process of claim 3 in which a bed of such perborate material about 3 to 8 cm. high is maintained in such rotary tube.

5. The process of claim 2 in which the perborate material is supported by a granulation disk and maintained in motion by rotation of such disk about its vertical axis while it is sprayed with the aqueous binding agent solution and rehydrated.

6. The process of claim 2 in which said binding agent is polyvinyl alcohol.

7. The process of claim 2 in which said binding agent is dextrin.

8. The process of claim 1 in which said binding agent is a water soluble alkali metal salt of polyacrylic or polymethacrylic resin.

9. The process of claim 1 in which said binding agent solution additionally contains a stabilizer for active oxygen.

References Cited by the Examiner

UNITED STATES PATENTS 2,592,421    4/1952    Heilmann _____ 264—117 X
2,900,668    8/1959    Hubner et al. _____ 264—177

ALEXANDER H. BRODMERKEL, *Primary Examiner.*